(12) United States Patent
Schildroth et al.

(10) Patent No.: US 11,297,768 B2
(45) Date of Patent: Apr. 12, 2022

(54) VISION BASED STALK SENSORS AND ASSOCIATED SYSTEMS AND METHODS

(71) Applicant: Ag Leader Technology, Ames, IA (US)

(72) Inventors: Rhett Schildroth, North Liberty, IA (US); Roger Zielke, Huxley, IA (US); Barry Anderson, Ames, IA (US); Scott Eichhorn, Ames, IA (US); Tony Woodcock, Ames, IA (US); Vahid Ellig, Roland, IA (US)

(73) Assignee: Ag Leader Technology, Ames, IA (US)

( * ) Notice: Subject to any disclaimer, the term of this patent is extended or adjusted under 35 U.S.C. 154(b) by 80 days.

(21) Appl. No.: 16/800,469

(22) Filed: Feb. 25, 2020

(65) Prior Publication Data

US 2020/0267899 A1 Aug. 27, 2020

Related U.S. Application Data

(63) Continuation of application No. 16/445,161, filed on Jun. 18, 2019, now Pat. No. 11,064,653.

(60) Provisional application No. 62/810,231, filed on Feb. 25, 2019, provisional application No. 62/895,676, filed on Sep. 4, 2019.

(51) Int. Cl.
| | |
|---|---|
| *G08C 19/22* | (2006.01) |
| *A01D 41/127* | (2006.01) |
| *A01D 45/02* | (2006.01) |
| *H04Q 9/02* | (2006.01) |
| *G01B 5/10* | (2006.01) |

(52) U.S. Cl.
CPC ......... *A01D 41/127* (2013.01); *A01D 45/023* (2013.01); *G01B 5/10* (2013.01); *H04Q 9/02* (2013.01); *H04Q 2209/84* (2013.01)

(58) Field of Classification Search
CPC .. A01D 41/127; A01D 45/023; A01D 45/021; H04Q 9/02; H04Q 2209/84; H04Q 9/00; G01B 5/10; G01B 5/025
USPC ............................................ 340/870, 870.07
See application file for complete search history.

(56) References Cited

U.S. PATENT DOCUMENTS

| | | | |
|---|---|---|---|
| 4,166,349 | A | 9/1979 | Coenenberg et al. |
| 4,883,964 | A | 11/1989 | Bohman |
| 4,918,441 | A | 4/1990 | Bohman |

(Continued)

FOREIGN PATENT DOCUMENTS

| CA | 2313376 | 7/2000 |
|---|---|---|

OTHER PUBLICATIONS

Baweja, Harjatin & Parhar, Tanvir & Mirbod, Omeed & Nuske, Stephen. (2018). StalkNet: A Deep Learning Pipeline for High-Throughput Measurement of Plant Stalk Count and Stalk Width.

(Continued)

*Primary Examiner* — Tai T Nguyen
(74) *Attorney, Agent, or Firm* — Dentons Davis Brown, P.C.; Matthew Warner-Blankenship

(57) ABSTRACT

The present disclosure is related to agricultural devices, system, and methods, particularly for detecting and measuring plant stalks during harvest. The system may comprise a harvesting row unit, with a camera, a processing unit, and an in-cab display. The system may additionally include a stalk alignment guide, a leaf shield, an artificial light source, and/or a lens cleaning apparatus.

19 Claims, 12 Drawing Sheets

(56) References Cited

U.S. PATENT DOCUMENTS

| | | | |
|---|---|---|---|
| 4,967,362 | A | 10/1990 | Schutten et al. |
| 5,044,210 | A | 9/1991 | Kuhn et al. |
| 5,568,405 | A | 10/1996 | Easton et al. |
| 5,598,794 | A | 2/1997 | Harms et al. |
| 5,680,750 | A | 10/1997 | Stefl |
| 5,790,428 | A | 8/1998 | Easton et al. |
| 5,878,561 | A | 3/1999 | Gunn |
| 5,991,694 | A | 11/1999 | Gudat et al. |
| 6,073,427 | A | 6/2000 | Nichols |
| 6,085,846 | A | 7/2000 | Buchl et al. |
| 6,119,442 | A | 9/2000 | Hale |
| 6,216,795 | B1 | 4/2001 | Buchl |
| 6,584,390 | B2 | 6/2003 | Beck |
| 6,668,223 | B2 | 12/2003 | Blackmore et al. |
| 6,983,582 | B1 | 1/2006 | Muckler |
| 6,986,582 | B2 | 1/2006 | Muckler |
| 7,401,528 | B2 | 7/2008 | Deppermann et al. |
| 7,716,905 | B2 | 5/2010 | Wilcox et al. |
| 7,916,898 | B2 | 3/2011 | Anderson |
| 8,010,261 | B2 | 8/2011 | Brubaker |
| 8,196,380 | B2 | 6/2012 | Carboni |
| 8,215,191 | B2 | 7/2012 | Tragesser et al. |
| 8,220,235 | B2 | 7/2012 | Kowalchuk |
| 8,224,534 | B2 | 7/2012 | Kowalchuk |
| 8,418,636 | B2 | 4/2013 | Liu et al. |
| 8,820,039 | B2 | 9/2014 | Werning |
| 9,030,549 | B2 | 5/2015 | Redden |
| 9,064,173 | B2 | 6/2015 | Redden |
| 9,066,463 | B2 | 6/2015 | Lange |
| 9,232,693 | B2 | 1/2016 | Hendrickson et al. |
| 9,282,693 | B2 | 3/2016 | Anderson |
| 9,310,329 | B2 | 4/2016 | Acheson et al. |
| 9,320,196 | B2 | 4/2016 | Dybro et al. |
| 9,322,629 | B2* | 4/2016 | Sauder .................. G01B 5/10 |
| 9,372,109 | B2 | 6/2016 | Acheson et al. |
| 9,410,840 | B2 | 8/2016 | Acheson et al. |
| 9,485,914 | B2 | 11/2016 | Schleicher et al. |
| 9,565,802 | B2 | 2/2017 | Schleicher |
| 9,658,201 | B2 | 5/2017 | Redden et al. |
| 9,668,420 | B2* | 6/2017 | Anderson .......... A01D 41/1271 |
| 9,693,496 | B2 | 7/2017 | Tevs et al. |
| 9,693,503 | B2 | 7/2017 | Dybro et al. |
| 9,717,171 | B2 | 8/2017 | Redden et al. |
| 9,756,771 | B2 | 9/2017 | Redden |
| 9,804,097 | B1 | 10/2017 | Tang et al. |
| 9,832,928 | B2 | 12/2017 | Dybro et al. |
| 9,867,334 | B2 | 1/2018 | Jongmans et al. |
| 9,867,335 | B1 | 1/2018 | Obbink et al. |
| 9,894,835 | B2 | 2/2018 | Sauder et al. |
| 9,921,064 | B2 | 3/2018 | Schleicher |
| 9,927,242 | B2 | 3/2018 | Schleicher |
| 9,936,631 | B1 | 4/2018 | Hubner et al. |
| 9,936,637 | B2 | 4/2018 | Anderson et al. |
| 10,034,424 | B2 | 7/2018 | Anderson et al. |
| 10,039,231 | B2 | 8/2018 | Anderson et al. |
| 10,178,828 | B2* | 1/2019 | Hendrickson ........ A01D 41/127 |
| 10,537,060 | B2 | 1/2020 | Sauder et al. |
| 10,820,508 | B2 | 11/2020 | Dix et al. |
| 10,859,479 | B2 | 12/2020 | Brune et al. |
| 2002/0173893 | A1 | 11/2002 | Blackmore et al. |
| 2011/0173942 | A1 | 7/2011 | Kowalchuk |
| 2012/0029757 | A1 | 2/2012 | Kowalchuk |
| 2012/0042619 | A1 | 2/2012 | Lohrentz et al. |
| 2012/0204528 | A1 | 8/2012 | Regier |
| 2013/0125800 | A1 | 5/2013 | Landphair et al. |
| 2015/0289438 | A1 | 10/2015 | Sauder et al. |
| 2015/0293068 | A1 | 10/2015 | Acheson et al. |
| 2016/0037709 | A1 | 2/2016 | Sauder et al. |
| 2016/0084813 | A1* | 3/2016 | Anderson .......... A01D 41/1271 702/5 |
| 2016/0338267 | A1 | 11/2016 | Anderson et al. |
| 2019/0195762 | A1 | 6/2019 | Brune |

OTHER PUBLICATIONS

Jonathan P. Kelly, "By-Plant Prediction of Corn (*Zea mays* L.) Grain Yield Using Height and Stalk Diameter", 2009, Publisher: Faculty of the Graduate College of the Oklahoma State University.

Sudduth, K.A., Birrell, S.J., Krumpelman, M.J., Robert, P., Rust, R.H., & Larson, W.E. (2000). Field evaluation of a corn population sensor.

Birrell et al., "Corn Population Sensor for Precision Farming", American Society of Agricultural Engineers. Annual Meeting, 1995, vol. 95, No. 1334, Publisher: ASAE.

"Harvest Study Reveals most corn heads leaving yield in the field.", 2020 Special Report, 2020, Row by Row.

Farm Show, "Easton Goers, Inc. Space Wheel Checks Seed Placement in Field—Space Cadet", 1996, Publisher: Farm Show.

D. Easton, "Corn Population and Plant Spacing Variability: The Next Mapping Layer", 1996, pp. 723-727, Publisher: ASA-CSSA-SSSA, Published in: Madison, WI.

Jonathan P. Kelly, "By-Plant Prediction of Corn Grain Yield Using Height and Stalk Diameter", 2009, Publisher: Faculty of the Graduate College of the Oklahoma State University.

Haizhou Li, "Design and Evaluation of a Non-Intrusive Corn Population Sensor", Trace: Tennessee Research and Creative Exchange, Doctoral Dissertations, Graduate School, Aug. 2007, Publisher: University of Tennessee, Knoxville.

Luck et al., "Sensor Ranging Technique for Determining Corn Plant Population", Faculty Papers and Publications in Animal Science—Animal Science Department, 2008, vol. 920, Publisher: University of Nebraska—Lincoln.

Plattner et al., "Corn Plant Population Sensor for Precision Agriculture", 1996.

Headsight, Inc., Row Guidance for Com, Jan. 2021, Page(s) https://headsight.com/row-guidance-com, Publisher Headsight, Inc.

Yeyin Shi, "Corn Plant Location, Spacing and Stalk Diameter Measurements Using Optical Sensing Technologies", May 2014, Publisher: Faculty of the Graduate College of the Oklahoma State University.

Shrestha et al., "Automatic Corn Plant Population Measurement Using Machine Vision", Transactions of the ASAE, 2003, pp. 559-565, vol. 46(2), Publisher: American Society of Agricultural Engineers.

Sudduth et al., "Field Evaluation of a Corn Population Sensor", 2000.

Yu et al., "Outlier Elimination for Robust Ellipse and Ellipsoid Fitting", Oct. 24, 2009.

\* cited by examiner

VISION BASED STALK SENSORS AND ASSOCIATED SYSTEMS AND METHODS

CROSS-REFERENCE TO RELATED APPLICATION(S)

This application claims the benefit under 35 U.S.C. § 119(e) or 35 U.S.C. § 120 to U.S. Provisional Application 62/810,231, filed Feb. 25, 2019, and entitled "Corn Head Stalk Sensor Data Visualization," U.S. Provisional Application 62/895,676, filed Sep. 4, 2019, and entitled "Apparatus, Systems, and Methods for Stalk Sensing," and U.S. application Ser. No. 16/445,161, filed Jun. 18, 2019, and entitled "Agricultural Systems Having Stalk Sensors and/or Data Visualization Systems and Related Devices and Methods," each of which is incorporated herein by reference in its entirety for all purposes.

TECHNICAL FIELD

The present disclosure relates to agricultural implements, particularly to agricultural implements for detecting and measuring plant stalks during harvest.

BACKGROUND

The present disclosure relates to agricultural implements for use during harvest to detect and measure plant stalks.

There is a need in the art for improved devices, systems, and methods for accurately detecting and measuring plant stalks in real-time or near real-time.

BRIEF SUMMARY

The disclosed devices, systems, and methods relate to a plant stalk detection and measurement with the use of cameras and vision recognition.

In various implementations, cameras use one or more lenses to focus light from a field of view of the camera onto a two-dimensional sensor array. Data from each sensor in the array is captured for the same time period, referred to as a frame. Each camera samples its field of view for a specified exposure time at a specified frame rate. Each frame represents an image, which is transferred to a processing unit. The processing unit uses specialized algorithms when processing the image data to detect the presence of plant stalks and to measure the stalk size. When plant stalks are detected and measured by the processing unit, the information is conveyed to an in-cab display or field computer, which then assigns the detected stalk to a physical position, sometimes in the form of latitude and longitude. The in-cab display (or field computer) logs each detected stalk, its measurements and position and may create visualizations of the detected plant stalk data. The in-cab display may also provide statistical analyses based on the detected plant stalk data.

In Example 1, a harvesting device comprising a plurality of row units, each row unit comprising a camera, a processor in communication with the camera, the processor constructed and arranged to process images acquired by the camera to detect stalks, and a display in communication with the at least one processor, the display configured to display data acquired from the images, wherein the data acquired from the images include stalk location and stalk size.

In Example 2, the device of Example 1, further comprising an artificial light disposed adjacent to the camera on the row unit.

In Example 3, the device of Example 1, further comprising a lens cleaning brush operatively engaged with the camera.

In Example 4, the device of Example 1, further comprising a distance sensor disposed each row unit.

In Example 5, the device of Example 1, further comprising an alignment guide.

In Example 6, the device of Example 5, wherein the alignment guide further comprises a brush.

In Example 7, the device of Example 5, wherein the alignment guide further comprises an air shield.

In Example 8, a method for detecting and measuring stalks comprising acquiring at least one image of a stalk, sending the at least one image to a processor, processing the at least one image via one or more algorithms to detect stalks and determine stalk size, and outputting data related to the detected stalk and stalk size.

In Example 9, the method of Example 8, wherein the one or more algorithms include at least one of vision recognition, machine learning, and deep learning.

In Example 10, the method of Example 8, wherein the one or more algorithms include at least one of edge detection, corner detection, and texture analysis.

In Example 11, the method of Example 8, further comprising measuring gaps between stalks.

In Example 12, the method of Example 8, further comprising associating each stalk with a GPS position.

In Example 13, the method of Example 8, further comprising performing image correction.

In Example 14, the method of Example 8, further comprising acquiring harvester speed data and frame rate data.

In Example 15, a system for providing harvest data comprising a row unit, an image sensor on the row unit, and a processor in communication with the image sensor, wherein the image sensor acquires images during harvest and wherein the processor is constructed and arranged to process the acquired image to detect stalks.

In Example 16, the system of Example 15, wherein the processor is further constructed and arranged to determine stalk size.

In Example 17, the system of Example 16, wherein the processor is further constructed and arranged to determine spaces between stalks.

In Example 18, the system of Example 17, wherein the processor is further constructed and arranged to correct image distortion.

In Example 19, the system of Example 18, wherein the stalk size is determined by detecting boundary lines.

In Example 20, the system of Example 19, wherein the system is constructed and arranged to determine the distance between the image sensor and a stalk.

For each Example, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. Other embodiments of this aspect include corresponding computer systems, apparatus, and computer programs recorded on one or more computer storage devices, each configured to perform the actions of the methods.

While multiple embodiments are disclosed, still other embodiments of the disclosure will become apparent to those skilled in the art from the following detailed description, which shows and describes illustrative embodiments of the invention. As will be realized, the disclosure is capable of modifications in various obvious aspects, all without departing from the spirit and scope of the disclosure. Accordingly, the drawings and detailed description are to be regarded as illustrative in nature and not restrictive.

DETAILED DESCRIPTION

The disclosed implementations relate to devices, systems, and methods for detecting and measuring plant stalks on a corn head. More particularly, the disclosed devices, systems, and methods utilize one or more cameras to capture images of plant stalks as they enter a row unit, such as of a harvester. The images captured by the camera or cameras may then be variously processed to determine one or more characteristics about the stalks such as the size, location, and other parameters related to the plant stalks and/or harvest. In certain implementations the processed images and data therefrom may be transmitted to an in-cab display or to various other computer systems.

Figure 1:
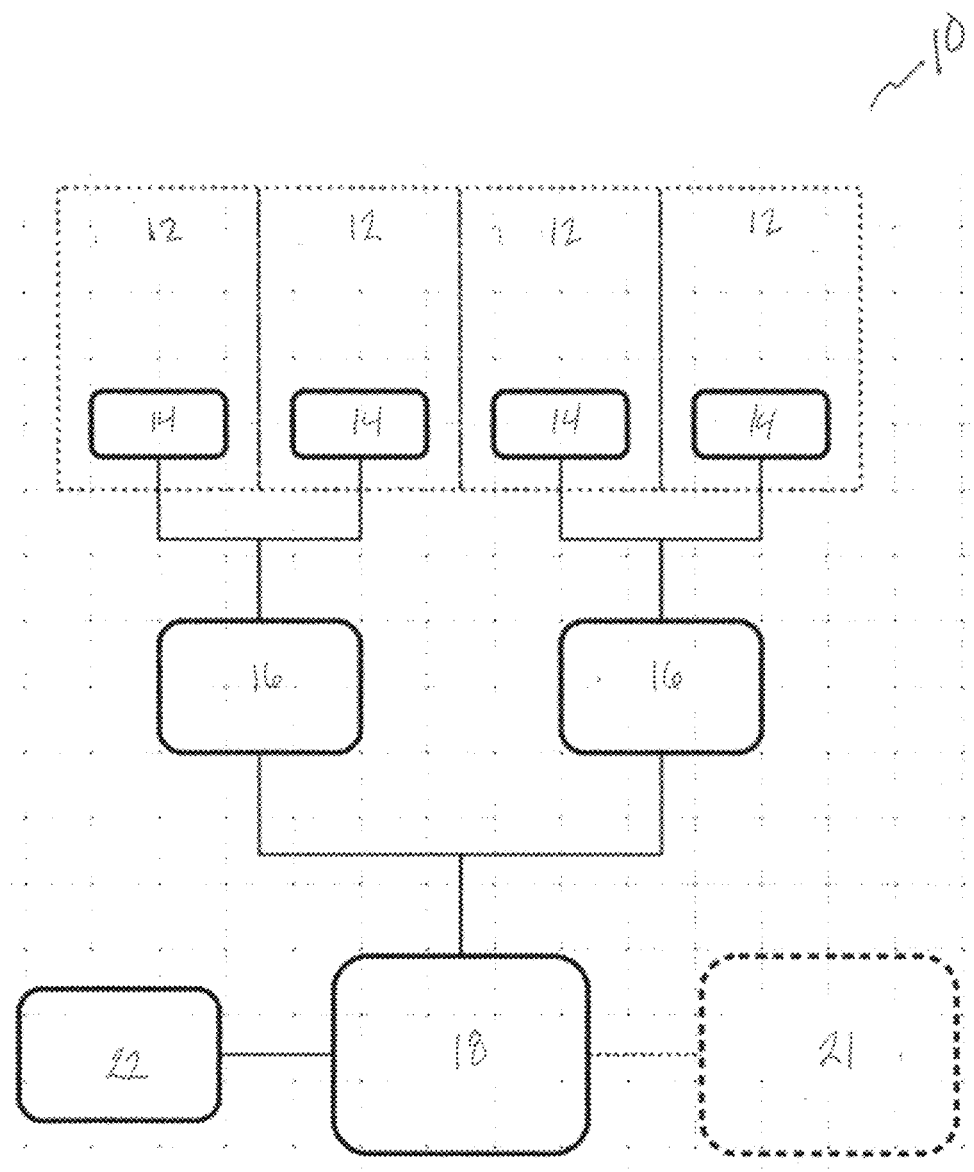
FIG. 1 is a schematic depicting the stalk vision system, according to one implementation.

Turning to the figures in more detail, FIG. 1 depicts an exemplary schematic of the stalk vision system 10, according to one implementation. In some implementations, the system 10 includes at least one camera 14 placed on or adjacent to each corn head or harvesting row unit 12, such that each of the incoming plant stalks (depicted at 2 in FIGS. 2-9 and 11) passes through the field of view of a camera 14.

The data captured by the camera 14 may include digital images or frames in some implementations. This data may be sent to a processing unit 16 where a combination of various software and hardware perform image processing algorithms that detect the presence of plant stalks 2 and measure stalk size. In some implementations, the processing unit 16 is connected to one or more cameras 14 of one or more harvesting row units 12. In alternate implementations, a processing 16 unit may be integrated with each camera 14 in a single unit. Further implementations are of course possible, and may incorporate various hardware and software components understood by those of skill in the art.

Continuing with the implementation of FIG. 1, the images captured by the camera(s) 14 are processed on the processor 16 by algorithms that may include use of any number of vision recognition techniques including, but not limited to, machine learning, deep learning algorithms, and/or other methods known to those skilled in the art. Traditional machine learning may utilize edge detection, corner detection, texture analysis, and/or other object recognition techniques in pre-defined sequences to identify plant stalks 2 and other objects. Deep learning methods may include convolutional neural networks trained with numerous images where any plant stalks 2 have been identified to allow the network to "learn" the image characteristics that define a plant stalk 2. In various implementations, the network may be augmented with images that have been post-processed to alter their appearance to simulate other types of images the system could be expected to encounter.

Figure 2B:
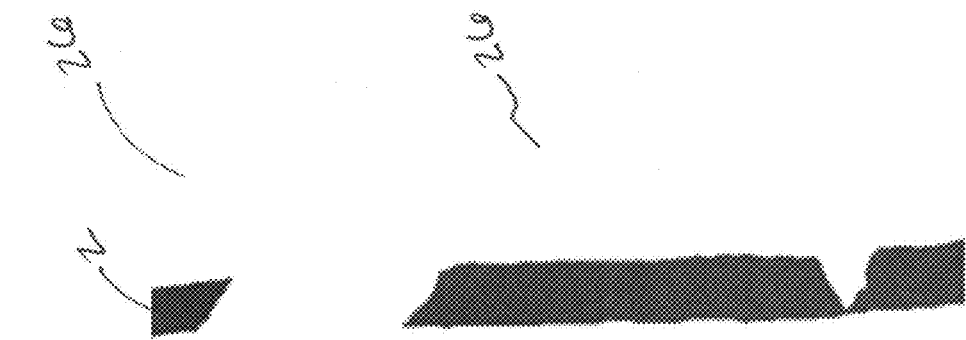
FIG. 2B is an exemplary processed image.
Figure 2A:
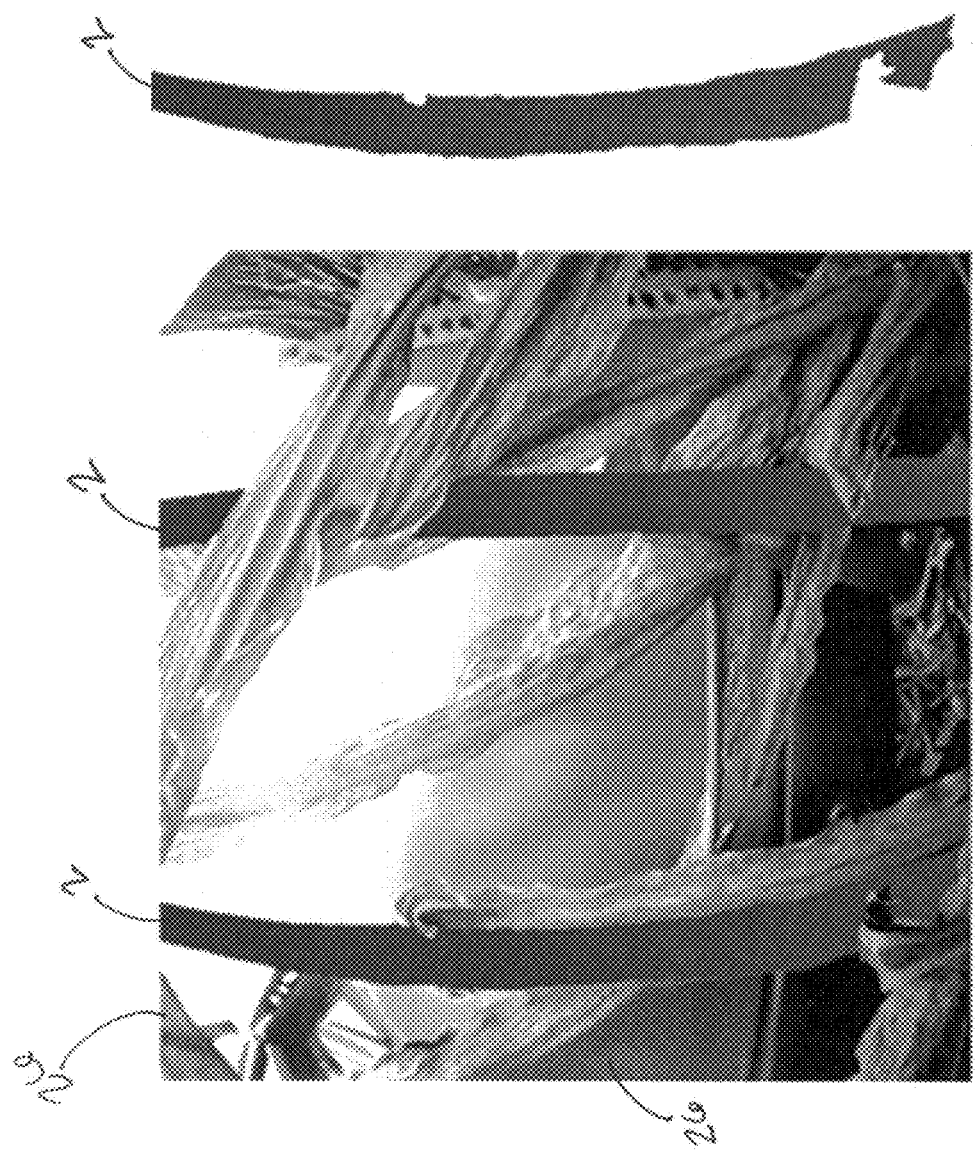
FIG. 2A is an exemplary camera image.

In the implementations of FIGS. 2A and 2B, the image processing algorithms, executed on a processor 16, are used to identify and/or mark pixels that define areas in the image where a plant stalk 2 is present or visible. FIG. 2A shows an exemplary implementation of an unprocessed image 26 of plant stalks 2, and FIG. 2B shows the image 26 after processing showing only those pixels that are part of the plant stalk 2. Once the data or image 26 is processed the system 10 is able to count the number of stalks that have passed through the field of view of the camera 14 and measure stalk size according to the "plant stalk" pixels in the image 26. In further implementations, the system 10 can perform other data collection and processing functions, as would be appreciated by those of skill in the art in light of this disclosure.

Turning back to FIG. 1, in some implementations, the processing units 16 are connected by a data bus or other operative connection to an in-cab display 18. The in-cab display 18 may perform data visualization and data logging on the plant stalk data received from the processing units 16. In various implementations, the in-cab display 18 may also perform the function of data relay. In various of these implementations, the processed data is transferred outside the harvester for use by other computing devices and displays, such as to the cloud, internet, or other external storage device.

The processing unit 16 is constructed and arranged to produce data indicating the detection of plant stalks 2 and the size of the detected plant stalks 2. In some implementations, the processing unit 16 may further produce data identifying and indicating a gap between stalks 2, which may include a measurement of the distance between adjacent stalks. In some implementations, the distance between stalks is calculated via utilization of speed-of-travel data from the harvester communicated to the system 10 from the harvester. As such, the in-cab display 18 and/or other components on the data bus (not shown) may be in electronic communication with the harvester and constructed and arranged to receive and process harvester information such as harvester speed in real-time or near real-time. In some implementations, various systems and devices on the harvester may be in communication with the processor 16 to facilitate the transfers of data and information regarding those systems and devices to the system 10 and processing of such data. Other harvester information may also be utilized in additional implementations.

In some implementations, use of harvester information can improve accuracy of the system 10. In various implementations, the processing units 16 use harvester information—such as the harvester speed—to properly detect the plant stalks 2 and measure the distance between the detected plant stalks 2. Using the harvester speed and the time between frames, the processing unit 16 may be constructed and arranged to determine whether a detected plant stalk 2 in a frame is the same stalk 2 already detected in a previous frame. In some implementations, the system 10 uses the harvester speed to predict where in the next frame the stalks 2 from the previous frame should appear. According to these implementations, the system 10 is able to detect the difference between stalks 2 counted and measured in the prior frame from new unmeasured stalks 2 that have entered the current frame, thereby preventing the system 10 from counting and measuring the same stalk 2 more than once.

In alternate implementations, other computer vision object tracking techniques may be used instead of the use of vehicle ground speed to follow the motion of individual stalks 2 discussed above. Such techniques include generative methods or discriminative methods.

Various implementations of the system 10 may also include a global positioning receiver or system 22 to deliver information about the position of the harvester. It is understood that the processing unit 16 and/or in-cab display 18 can use the measured global position to associate each detected and/or measured plant stalk 2 with a specific physical location on the earth.

Various implementations of the system 10 may also include various components for data storage and/or a distribution system 21, such as a memory, a processor, a database, a server, and/or other electronic communication and storage components understood by skilled artisans.

Figure 3:
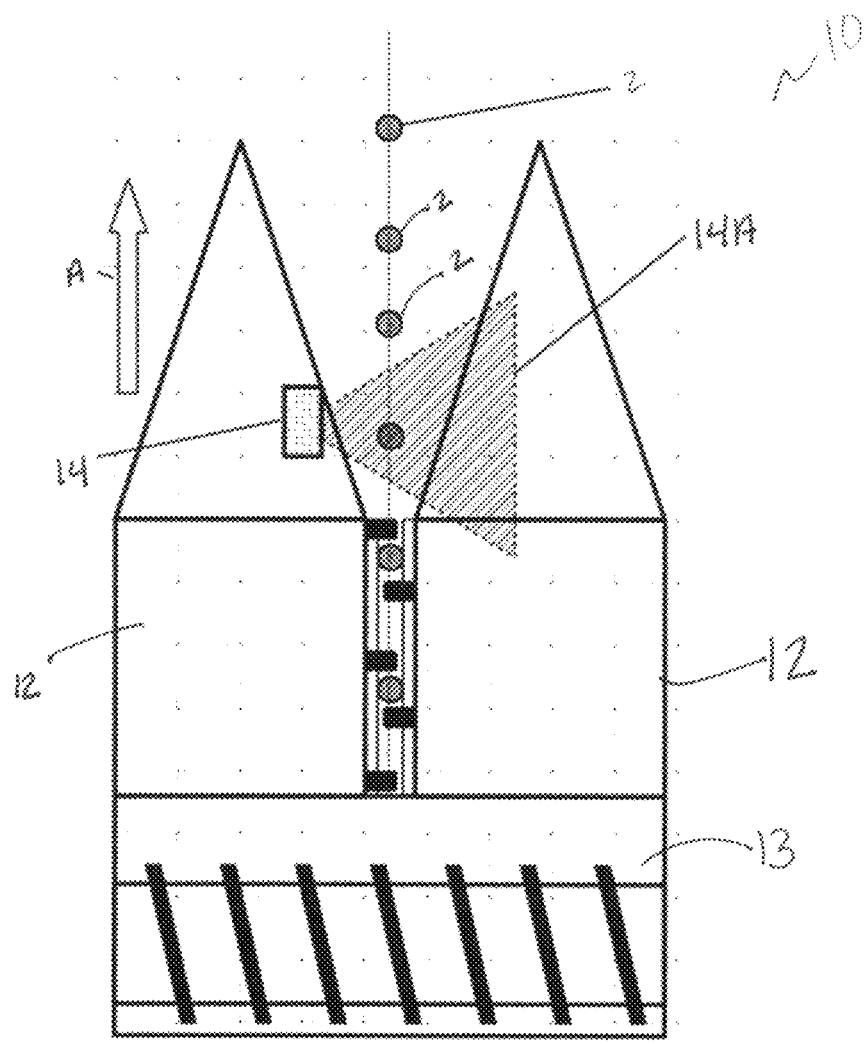
FIG. 3 is a top view of a row unit head with camera, according to one implementation.
Figure 4:
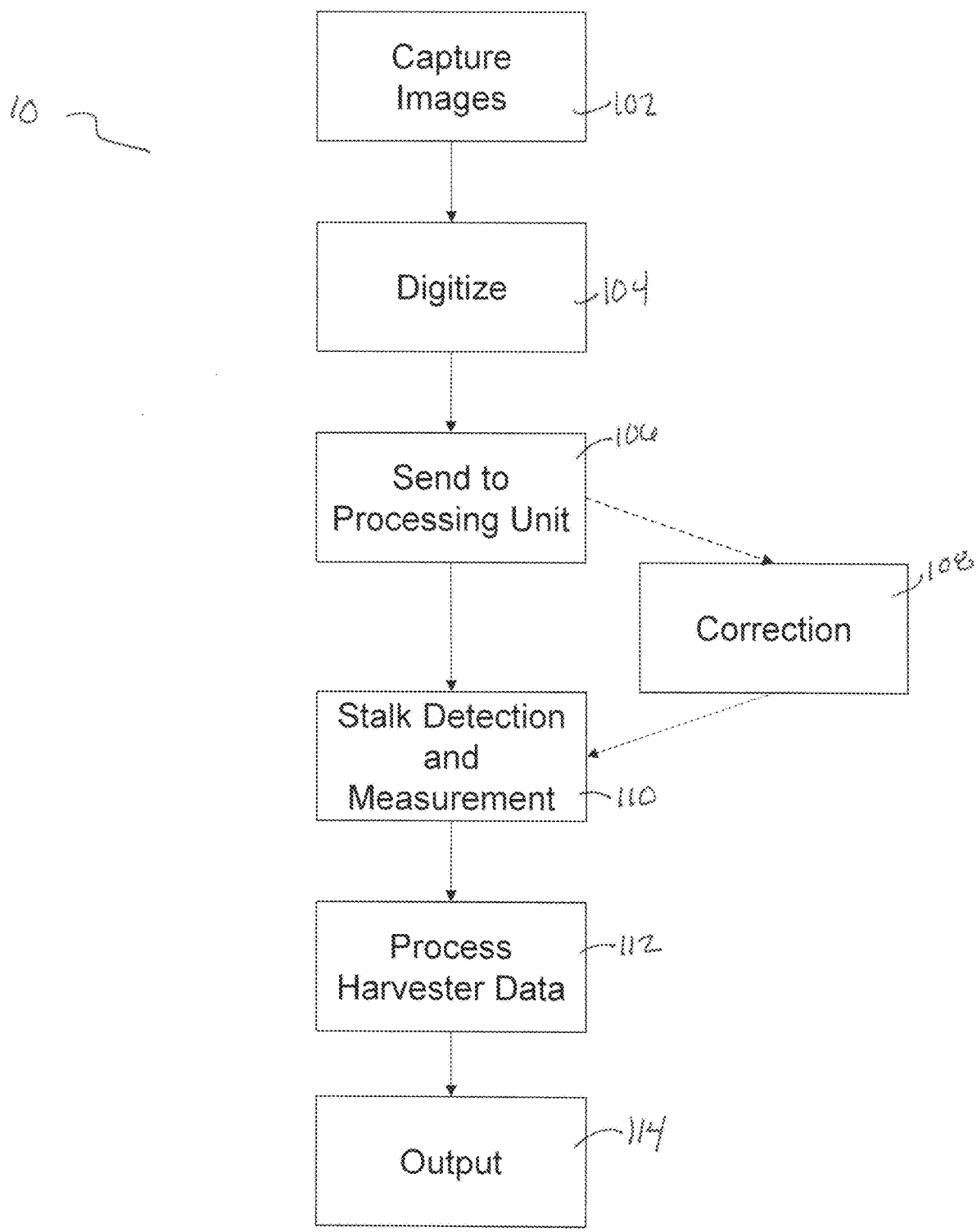
FIG. 4 is a flow chart showing the system, according to one implementation.

Turning to FIG. 3, in various implementations, a camera 14 is placed near the inlet of a row unit 12 of a row harvesting head 13. In various implementations, the camera 14 is a wide-angle camera 14. The camera 14 is placed in a position on the row unit 12 such that the field of view 14A of the camera 14 is at or near perpendicular to the harvested crop row and direction of travel of the harvester (reference arrow A). In some implementations, the camera 14 has a fish-eye lens or an ultra-wide angle lens to enable capturing a very wide angle of stalks 2 passing by at close range.

Figure 10:
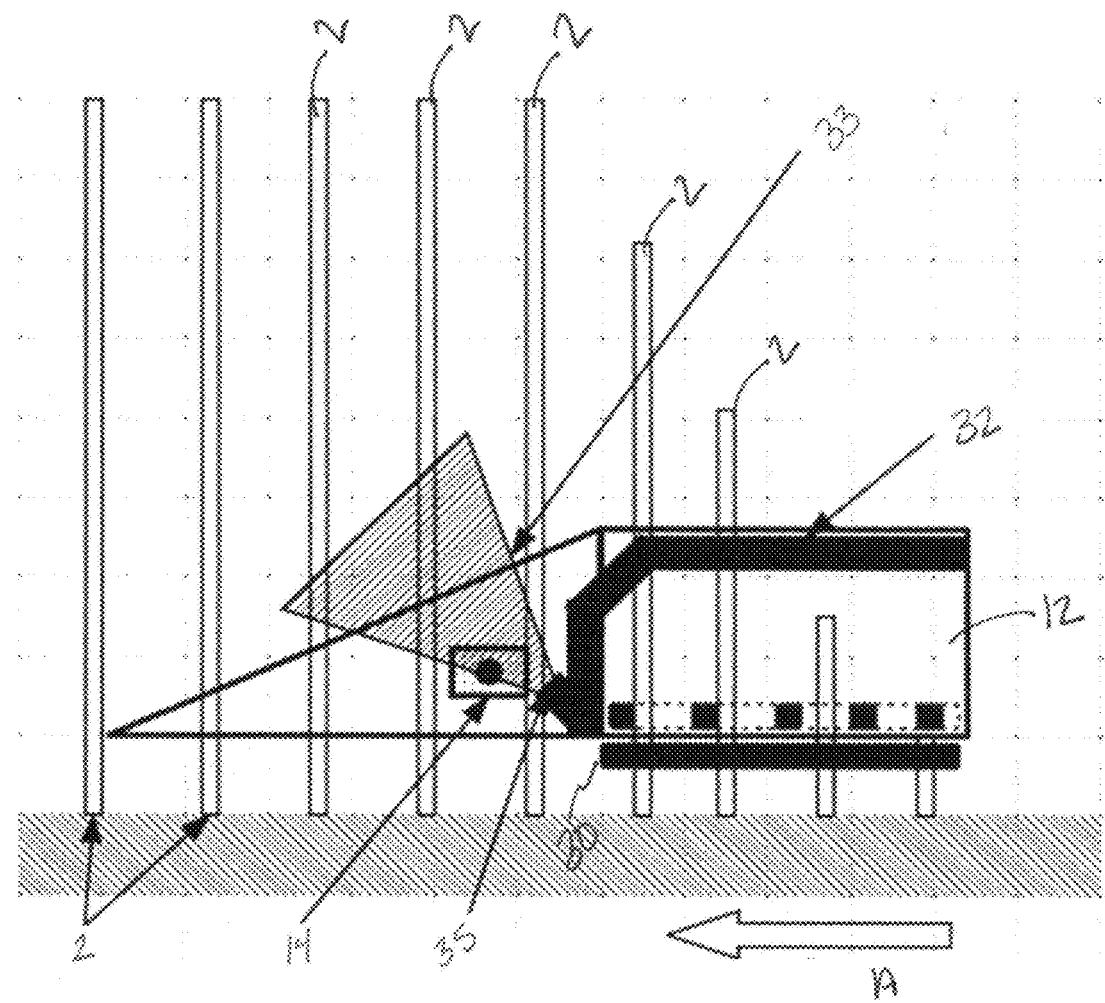
FIG. 10 is a side view of a row unit head with air shield, according to one implementation.

In use, according to certain implementations of the system 10 and as shown in FIG. 10, incoming plant stalks 2 pass through the field of view 14A of the camera 14 and the camera 14 captures images of the plant stalks 2 (box 102). It is appreciated that the camera frame rate should be sufficient to capture (box 102) at least one frame or image 26 per plant stalk 2 while the harvester is moving at its maximum harvesting speed. For example, in some implementations, the camera frame rate is about 60 Hz. The harvester head 13 and associated row units 12 are typically operated near ground level such that the camera 14 is placed just above ground level while capturing images (box 102) of the plant stalks 2.

In an optional system 10 step, the frames or images 26 from the camera 14 are digitized (box 104) and sent to a processing unit 16 (box 106). In a subsequent optional step, the processing unit 16, according to these implementations, performs detection and measurement (box 110) of plant stalks 2 that are captured in the frames and/or images 26, such as described in co-pending U.S. application Ser. No. 16/445,161, which is hereby incorporated by reference.

In some implementations of the system 10, the camera 14 or lens may introduce optical anomalies such as chromatic aberration, chroma, field curvature, barrel distortion, pincushion distortion, perspective distortion, or other anomalies as would be understood. In an optional step, any introduced anomalies may be corrected (box 108) via digital image processing before the image is processed by stalk detection and measurement algorithms (box 110). In one exemplary implementation, the digital image 26 may be processed to correct barrel distortion when the camera 14 features a fish-eye lens.

In another optional step, the system 10 according to certain implementations processes harvester information and data (box 112). In various implementations, the processing unit 16 uses the speed of the harvester and the frame rate of the camera 14 to identify and account for plant stalks 2 that are captured across multiple frames. The system 10, in these implementations, may use the harvester data to properly count the plant stalks 2 as they pass through the field of view of the camera 14. Use of the harvester speed and frame rate of the camera 14 may also allow for accurately measuring the distance between the plant stalks 2.

Figure 5:
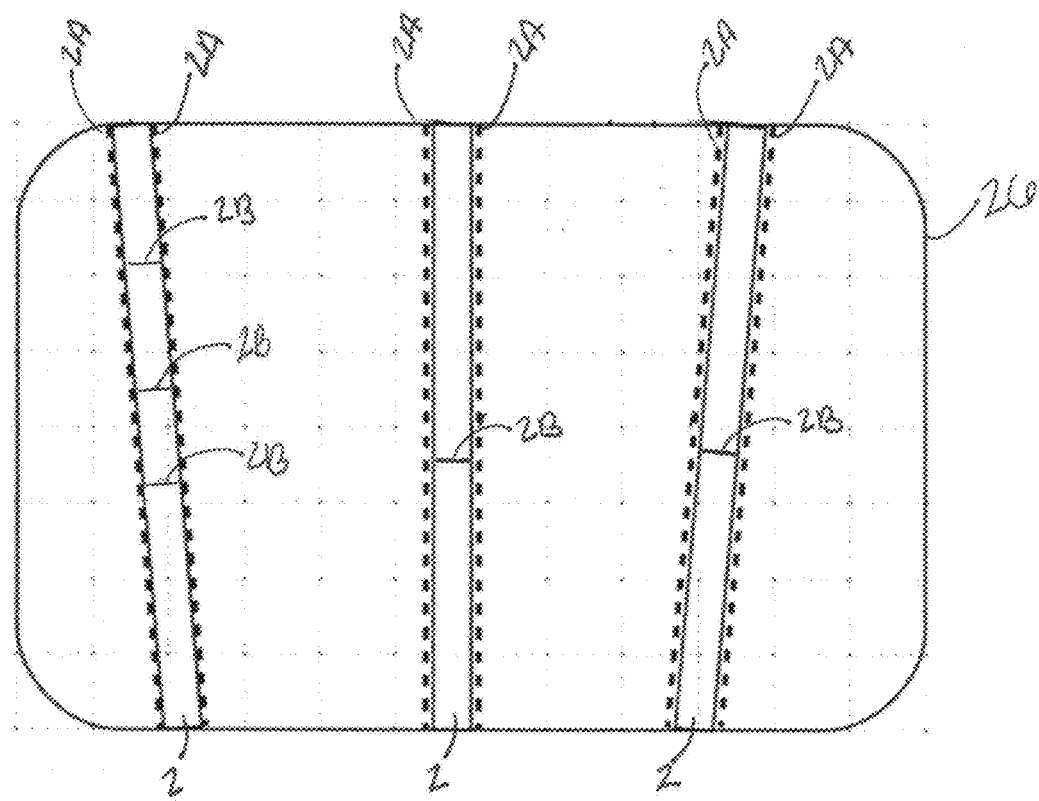
FIG. 5 is a schematic view of stalk detection, according to one implementation.

As shown in FIG. 5, the size of plant stalks 2 can be measured by detecting the boundary lines 2A of a detected stalk 2 in the frame or image 26. In some implementations, the boundary line 2A is the line of pixels in the image 26 where the edge of the stalk 2 meets the background. A detected stalk 2 usually will consist of two boundary lines 2A with a parallel or nearly parallel section.

In various implementations, the processing unit 16, can measure the size of the plant stalk 2 by measuring the pixel distance between the boundary lines 2A on a line 2B perpendicular to the boundary lines 2A. In some implementations, the plant stalk 2 size may be based on one or more perpendicular line 2B measurements along the detected boundary line 2A. By way of example, if multiple perpendicular lines 2B are used, a statistical function is applied, such as averaging the pixel distances, to determine the plant stalk 2 size.

Pixels within an image 26 can be translated into two dimensional physical measurements based on the geometry of the camera 14 and its lens and the location of detected boundary lines 2A in the image 26.

In alternate implementations, plant stalk 2 size may be measured using image segmentation. This various of these implementations, image segmentation identifies all the pixels in the image that are part of the plant stalk 2. The pixels can then be analyzed to determine overall plant stalk 2 shape and size. In these and other implementations, localized abnormalities in the stalk 2 can be prevented from adversely affecting the plant stalk 2 size determination.

In various implementations, where leaves or other foreign matter obstruct portions of the plant stalk 2, occlusion detection may be implemented to identify and compensate for the loss of data.

Figure 6:
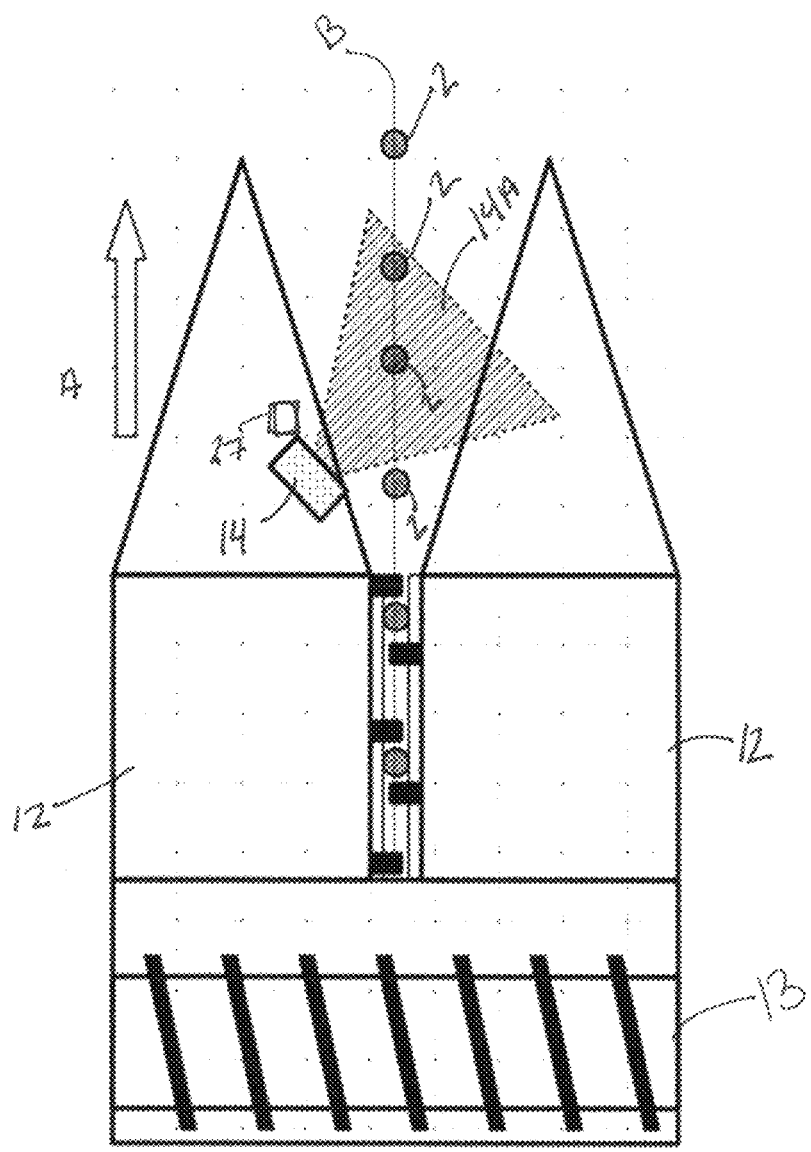
FIG. 6 is a top view of a row unit head with angled camera, according to one implementation.

Turning to FIG. 6, in an alternate implementation, the camera 14 is positioned on the row unit 12 such that the field of view 14A of the camera 14 is forward looking. In these and other implementations, the forward-looking field of view 14A of the camera 14 is such that it sees the incoming plant stalks 2 for a longer period of time as they are entering the harvesting row unit 12.

In various implementations, it is necessary to know the distance between the camera 14 and the plant stalk 2 to accurately determine the size of a plant stalk 2, if only one camera 14 is implemented. In various of these implementations, the distance between the plant stalk 2 and the camera 14 is dependent upon the alignment of the harvesting row unit 12 to the row (shown as line B). If the harvesting row unit 12 is not centered with the row B, the distance from the plant stalks 2 to the camera 14 may vary by the amount allowed by the gathering structure of the harvesting row unit 12.

In some implementations, a distance measurement sensor 27 is used to determine the distance between the camera 14 and the plant stalk 2. In these implementations, the distance sensor 27 is mounted near the camera 14 and provides a distance measurement from the camera 14 to the plant stalks 2. The processing unit 16 uses the measured distance when processing the images 26 to more accurately determine plant stalk 2 size. In various implementations, the distance sensor 27 is a non-contact distance sensor such as an ultrasonic distance sensor, a light distance sensor (LiDAR), a radio frequency distance sensor (RADAR), or a capacitive proximity sensor. In alternate implementations, the distance sensor 27 is a contact sensor. A contact sensor, in some implementations, may include one or more physical elements mounted to the row harvesting unit 12 that contact the plant stalks 2 and deflect proportionally based on the distance from the sensor mounting point to the plant stalks 2, such as the wands of U.S. Application 62/895,676 which is incorporated by reference in its entirety.

In alternate implementations, a stereoscopic camera 14 is used to determine the distance between the camera 14 and the plant stalk 2. A stereoscopic camera 14 has at least two lenses and imaging sensors separated by a known distance. In these implementations, the camera 14 receives frames from the multiple lenses simultaneously and a processor 16 can then analyze the images to find corresponding points in each of the images, referred to as image rectification.

Once the two images have been correlated, or rectified, the geometry of the camera 14 setup allows distance to be determined for the correlated pixels in the two images. As such, depth and/or distance from the camera 14 to the plant stalk 2 can be determined when the images from the at least two cameras 14 or two lenses on a single camera 14 are processed.

In alternate implementations, a pattern of structured light can be used in conjunction with the camera 14 or cameras 14 to determine distance between the camera 14 and the plant stalk 2. Use of structured light for depth measurement with a camera 14, operates similarly to the use of stereoscopic cameras 14, discussed above, except that one of the cameras 14 or lenses is replaced by a light projector.

In one exemplary implementation, a statistically random pattern of light is projected as a large number of dots into the field of view 14A of a camera 14. The statistical uniqueness of the pattern in both directions allows the receiving camera 14 and processor 16 to correlate the pixels received by the camera 14 to the pixels projected by the light projector. The geometry between camera 14 and projector can then be used to determine the distance to the projected pixel.

In another exemplary implementation, a series of parallel light stripes are projected into the field of view 14A with a binary or gray-coding sequence. By reading the light pattern received by each pixel, the camera 14 and processor 16 can determine the corresponding stripe from the projector. Once the projected stripe is known, the geometry calculations can be applied to determine the distance to each pixel. Of course alternative methods of distance determination via image processing are possible and would be recognized by those of skill in the art.

Figure 7:
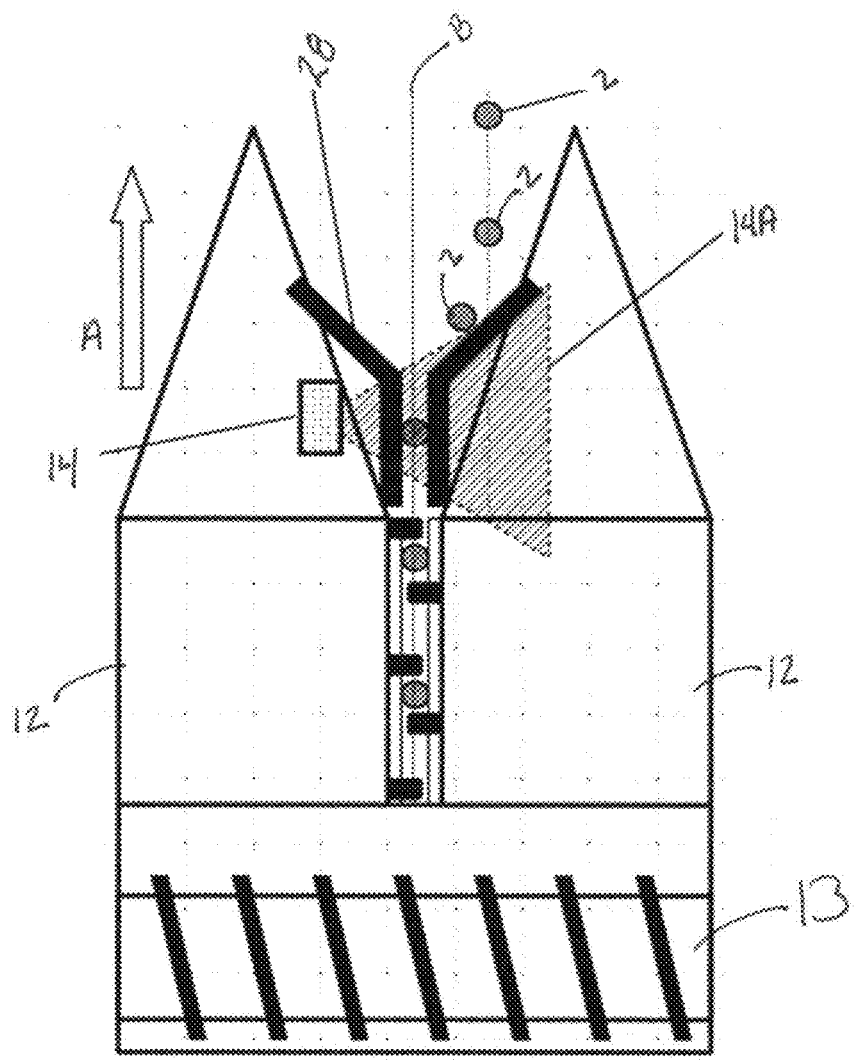
FIG. 7 is a top view of a row unit head with plant stalk alignment guide, according to one implementation.

Turning to FIG. 7, in an alternative implementation, an alignment guide 28 can be used to physically position the plant stalk 2 at a known distance from the camera 14 as the plant stalk 2 is passing through the field of view 14A. In these implementations, the guide 28 urges the incoming plant stalks 2 to a known distance from the camera 14 removing distance variability.

In some implementations, the alignment guide 28 is a movable member 28 mounted to the harvesting row unit 12. In various of these implementations, the guide 28 moves with the plant stalks 2 to align to the incoming row B. In some implementations, the guide 28 has an element attached of a known size that the camera can detect and measure in its field of view. In various implementations, the element is a visual reference object having a known shape, size, and/or color that is positioned on the guide to be detectable by the camera 14. In some implementations, the element is fixedly attached to the guide 28. The system 10, in various of these implementations, is constructed and arranged to perceive the element and its size. The camera 14 may then use the perceived size of the element and the known size of the element to determine the distance to the stalks 2.

In some implementations, the sizing element is part of the leaf shield, discussed further below.

In certain implementations, the element may be a piece of material, such as metal, a decal, a painted spot, a code or pattern, or any other known object/image as would be recognized by those of skill in the art. In one example, the element may be a "checkerboard" pattern where the size of the squares is known. In various of these implementations, the pattern may be distinct with clear lines and edges.

In some implementations, the camera 14 may be mounted to the alignment guide 28, such that as the plant stalk guide 28 moves to align with the row B the camera 14 moves. In these implementations, the distance between the camera 14 and the plant stalk 2 does not vary.

Various implementations for determining the distance between the camera 14 and the plant stalks 2 can be implemented together. For example, a distance sensor 27 can be implemented with the alignment guide 28. In various of these implementations, the distance sensor 27 measures the position of the guide 28 to determine the distance from the camera 14 to the plant stalks 2. The guide 28 may include various elements specifically tailored for use with the distance sensor 27 to ensure a reliable and accurate measurement. In some implementations the distance sensor 27 is a contact sensor. In some implementations, the various elements may include visual reference objects as discussed above.

In alternative implementations, the distance sensor 27 is an ultrasonic sensor 27. In these and other implementations, the various elements may include a flat, rigid surface disposed on the guide 28 in line with the ultrasonic sensor 27 such that the waves from the ultrasonic sensor 27 are reflected off of the surface. That is, the plane of the surface may be orthogonal to the ultrasonic sensor 27 to produce a high quality signal.

Figure 8:
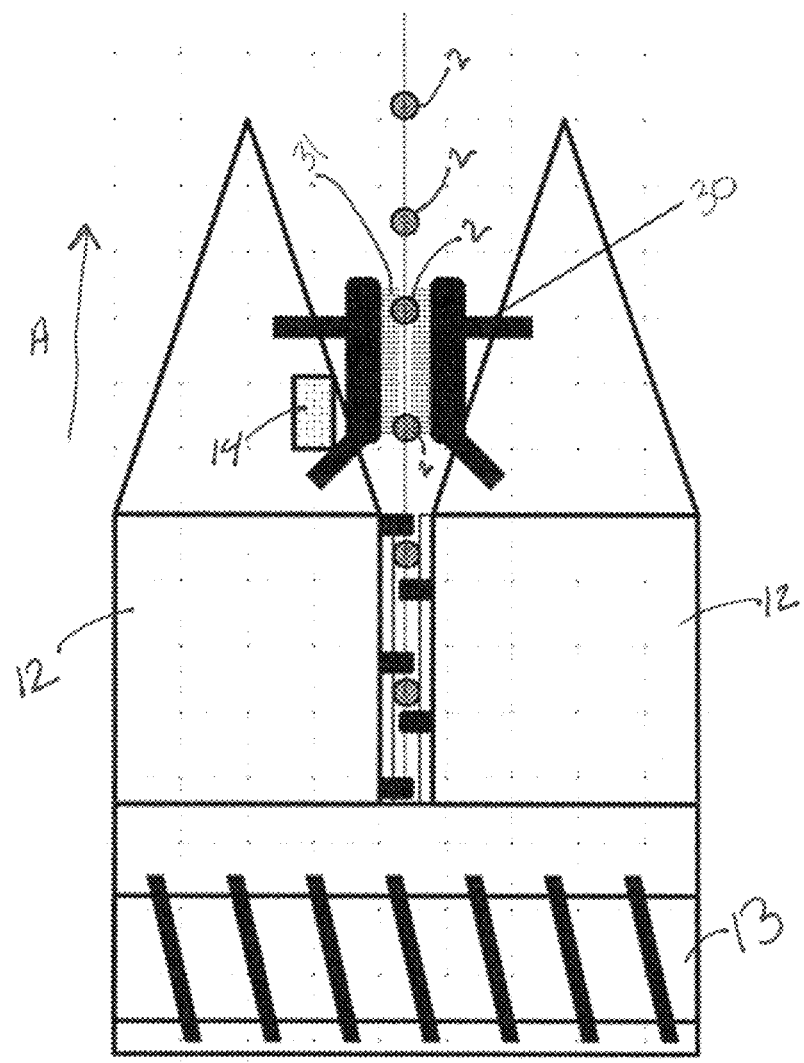
FIG. 8 is top view of a row unit head with brush shield, according to one implementation.
Figure 9:
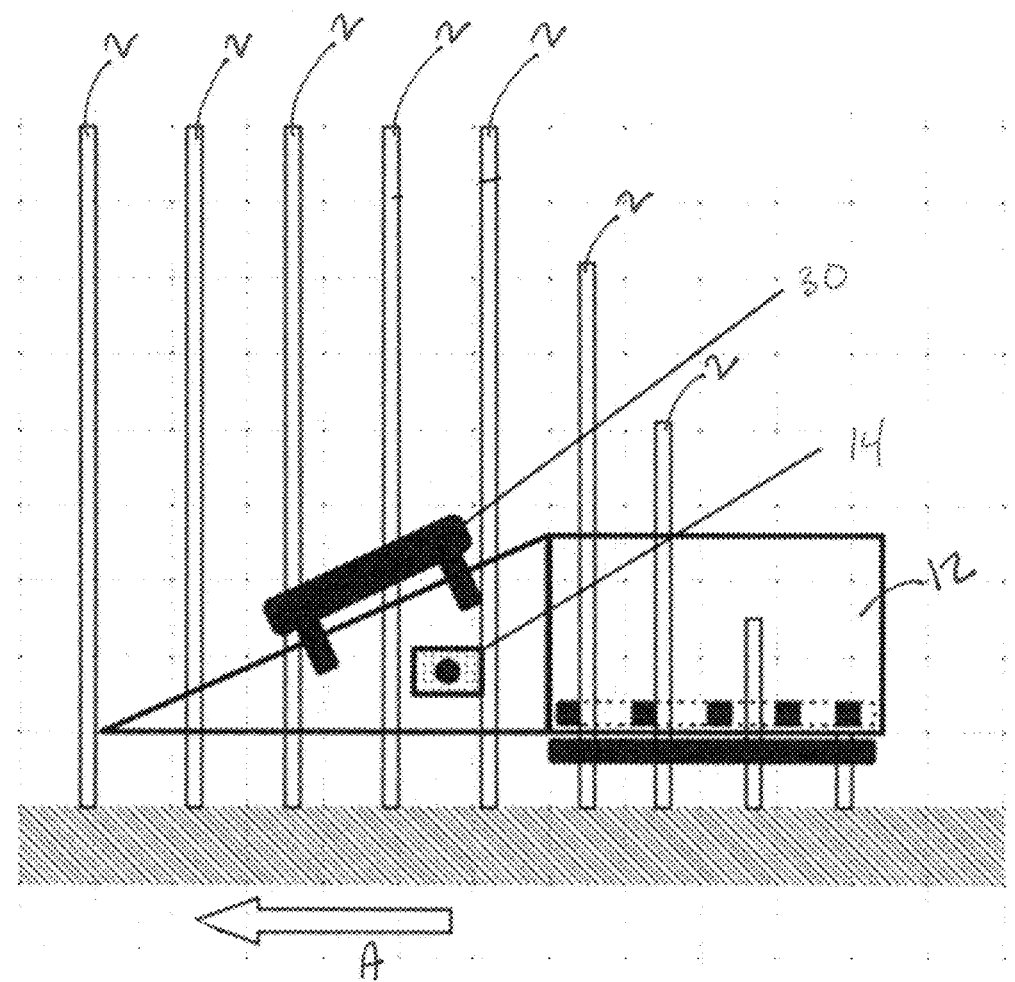
FIG. 9 is side view of a row unit head with brush shield, according to one implementation.

Turning to FIGS. 8-10, in some implementations, the system 10 has a leaf shield 30. The leaf shield 30 is constructed and arranged or otherwise configured to prevent leaves from blocking the field of view 14A of the camera 14. Many plants, such as corn, have leaves that may droop or otherwise die and fall towards the ground as the plant matures, these leaves can block the camera 14 from capturing a clear image of the plant stalk 2, thereby preventing the system 10 from properly detecting and measuring the plant stalks 2. Additionally, some leaves may resemble plant stalks 2, and if in the field of view of the camera 14, the system 10 may detect the leaf as a plant stalk 2.

FIGS. 8 and 10 depict a brush type leaf shield 30. In some implementations, the brush type leaf shield 30 may have rigidly mounted structures with flexible bristles 31. The structure of the flexible bristles 31 including the bristle material, bristle length, and spacing between bristles may vary. In various implementations the flexible bristles 31 and leaf shield 30 are arranged such that the plant stalks 2 can pass through the bristles 31 as the harvesting unit 12 moves through the field, but any leaves or debris are urged out of the field of view 14A. In these and other implementations, leaves cannot pass through the bristles 31, for example because the leaves do not have the mass or rigidity necessary. The placement and dimensions of the leaf shield 30 with bristles 31 force the leaves to move away from the field of view 14A of the camera 14 as the plant stalk 2 moves through the field of view 14A. This leaf movement prevents the leaves from obscuring the plant stalks 2 and/or causing improper plant stalk 2 detection.

In alternate implementations, the leaf shield 30 has a plurality of rake elements (not shown). In some implementations, the rake element has flexible elements, such as teeth or tines, which allow the plant stalks 2 to pass through, while the leaves of the plants are deflected away from the field of view 14A of the camera 14. The rake elements function similar to bristles 31, discussed above, in that they are flexible enough to allow the plant stalks 2 to pass through the field of view 14A, but rigid enough to prevent leaves from passing through.

In an alternate implementation, the leaf shield 30 includes air tubing 32 to create an air stream 33 that urges leaves away from the field of view 14A of a camera 14, as shown in FIG. 10. In these and other implementations, the air tubing 32 uses forced air to create an air stream 33 or curtain 33. The air tubing 32 may be routed along the side of the harvesting row unit 12 with an outlet 35 near the field of view 14A of the camera 14. An air pump or high speed fan (not shown) may be employed to move air through the tubing such that the air is released from the outlet 35 at a high speed, as would be understood. In these implementations, the forced air urges the leaves up and away from the field of view 14A of the camera 14. The air pump and tubing 32 can be sized appropriately to produce an air stream 33 exiting the outlet 35 that will easily move the leaves, but not significantly move the plant stalks 2.

Figure 11:
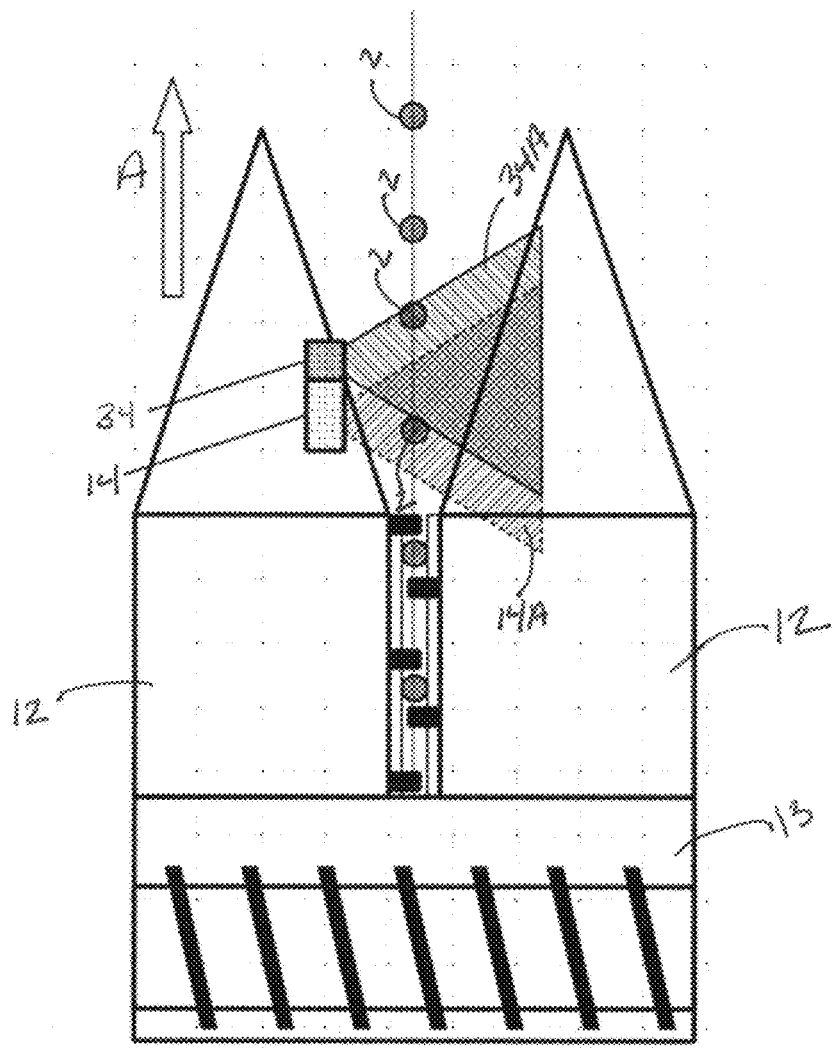
FIG. 11 is a top view of a row unit head with artificial light source, according to one implementation.

Turning to FIG. 11, in various implementations of the system 10 may include an artificial light source 34. In some implementations, having a known lighting direction and level can improve image processing. Natural light, such as sunlight, may be the primary source of light for the camera 14 but natural light is subject to significant and uncontrollable variation. This variation in natural light can increase the difficulty for the processing unit 16 to accurately and reliably detect and measure plant stalks 2. Additionally, harvesting may be performed at night with the aid of artificial light sources. The use of artificial light sources during nighttime harvesting can present a significant change from the lighting direction and levels from daytime operations.

In various implementations, the system 10 includes one or more artificial lights 34 placed at known locations relative to the camera 14. The artificial lights 34 may create a more consistent image 26 of the plant stalks 2 thereby increasing the accuracy of detection and measurement of the plant stalks 2.

In some implementations, the artificial lights 34 may emit light with wavelengths of light outside the visible range, but within the visible range for the camera 14. The use of artificial light sources 34 emitting wavelengths of lights outside the visible range can reduce or even eliminate many challenges associated with detection assisted by visible light, such as sunlight.

As shown in FIG. 11, in some implementations, an artificial light 34 is placed adjacent to the camera 14 projecting light 34A into the field of view 14A of the camera 14. The projected light 34A illuminates the plant stalks 2 as they enter the field of view 14A of the camera 14, resulting in more consistent lighting of plant stalks 2. In turn, the more consistent lighting creates more consistent images 26 and having more consistent images 26 allows for more reliable and accurate detection and measurement of the plant stalks 2. In various implementations, the system 10 may include multiple artificial light sources and locations.

In another implementation, the artificial light 34 may be placed in the field of view 14A projecting light in the direction of the camera 14. In these implementations, the plant stalks 2 are "back-lit", such that the shadows of the plant stalks 2 by the projected artificial light 34A is detected and analyzed by the camera 14 and processing unit 16 to detect and measure the plant stalks 2. In some implementations, the artificial light source 34 may project light 34A of sufficient intensity to penetrate thinner vegetation, such as leaves, but not the plant stalks 2.

As previously noted, having consistent lighting may allow for increased accuracy in plant stalk 2 detection and measurement. In some implementations, various filters can improve the lighting presented to the camera 14. For example, an optical polarizing filter can reduce the effect of light glare off of reflective surfaces and increase overall image contrast. In another example, digital filters may be applied as part of post-processing the image 26 prior to plant stalk 2 detection and measurement analyses. In these and other implementations, filters can include, but are not limited to noise reduction, smoothing, sharpening, contrast adjustment, color adjustments (HSL), and brightness adjustments.

Figure 12:
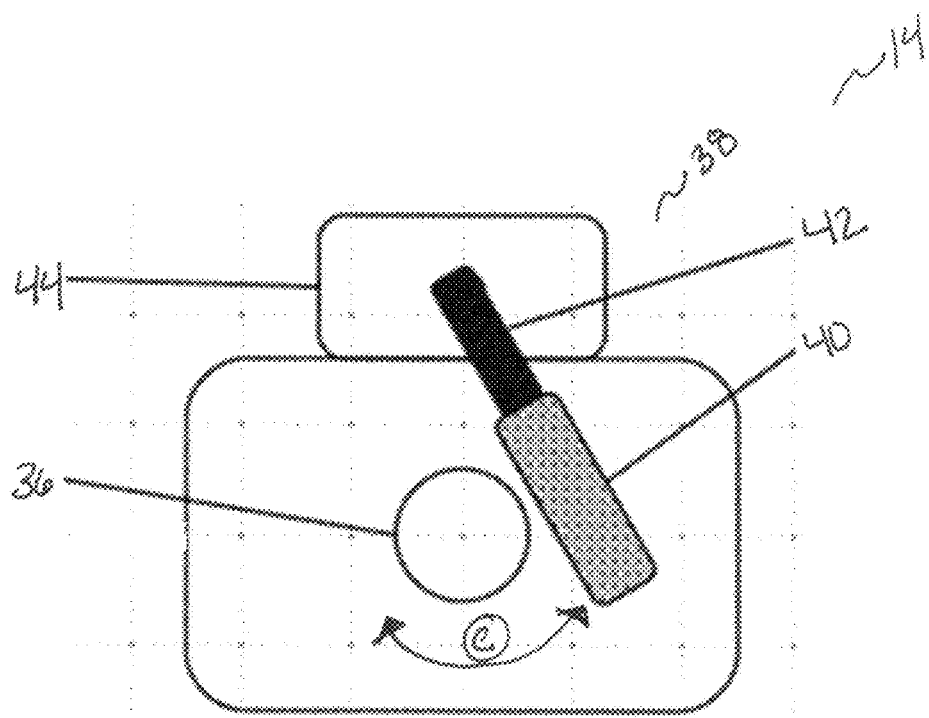
FIG. 12 is a front view of a camera with cleaning apparatus, according to one implementation.

In some implementations, the system 10 may include an automatic camera 14 lens cleaning apparatus 38, shown in FIG. 12. During harvest, the environment at the harvester row unit 12 can be very dusty. By way of example, the process of pulling the plants into the harvester creates dust and debris. Also during harvest, the harvester is moving and is exposed to the outside environment, and moving air carries and distributes the dust and debris across the harvesting row units 12. The dust and debris can build up on the camera lens 36 and degrade the images 26 and/or obscure the field of view 14A.

In some implementations, an automatic camera lens cleaning apparatus 38 is used to prevent the buildup of excessive dust and debris on the camera lens 36. In various implementations the cleaning apparatus 38 has a small rotational servo 44 with a bristled brush 40 mounted to an arm 42. When the servo 44 is activated, the brush 40 is rotated, in the direction of reference arrow C, via the arm 42 such that it brushes across the camera lens 36 to remove any dust and/or debris that has built up.

In various implementations, activation of the servo 44 can be controlled by the processing unit 16. The processing unit 16, by analyzing the captured images 26 from the camera 14, can estimate the amount of dust or debris on the camera lens 36. For example, if the processing unit 16 detects that dust and/or debris is immediately obscuring the lens 36, the servo 44 and brush 40 are immediately activated. In some implementations, the cleaning apparatus 38 may operate on an automatic schedule, such as every 1-5 minutes. In further implementations, the cleaning apparatus 38 may be activated manually by a user.

In another example, the processing unit 16 may wait until harvesting has paused before activating the servo 44 and brush 40 if dust and debris are only beginning to build up and are not yet impeding the detection and measurement of plant stalks 2. In these implementations, the deployment of the brush 40 will not obscure the view of the camera 14 while the system 10 is actively detecting plant stalks 2.

Although the disclosure has been described with references to various embodiments, persons skilled in the art will recognized that changes may be made in form and detail without departing from the spirit and scope of this disclosure.

What is claimed is:

1. A harvesting device comprising:
   (a) a plurality of row units, each row unit comprising a camera;
   (b) a processor in communication with the camera, the processor constructed and arranged to process images acquired by the camera to detect stalks; and
   (c) a display in communication with the at least one processor, the display configured to display data acquired from the images,
   wherein the data acquired from the images include stalk location and stalk size, and
   wherein the processor acquires a harvester speed and a frame rate of the camera to detect stalks captured in multiple images.

2. The device of claim 1, further comprising an artificial light disposed adjacent to the camera on the row unit for illumination of plant stalks.

3. The device of claim 1, further comprising a lens cleaning brush operatively engaged with the camera, the lens cleaning brush configured to prevent buildup of dust and debris on the camera.

4. The device of claim 1, further comprising a distance sensor disposed each row unit, the distance sensor configured to measure a distance from the camera to a stalk.

5. The device of claim 1, further comprising an alignment guide configured for positioning of plant stalks with respect to the camera.

6. The device of claim 5, wherein the alignment guide further comprises a brush shield configured to prevent leaves and debris from blocking a field of view of the camera.

7. The device of claim 5, wherein the alignment guide further comprises an air shield configured to prevent leaves and debris from blocking a field of view of the camera.

8. A method for detecting and measuring stalks comprising:
   acquiring one or more images of a stalk;
   sending the one or more images to a processor;
   determining a harvester speed when each of the one or more images was acquired;
   determining a frame rate of a camera when each of the one or more images was acquired;
   processing the at least one image via one or more algorithms to detect stalks and determine stalk size;
   identifying stalks that are present in one or more of the one or more images; and
   outputting data related to the detected stalk and stalk size.

9. The method of claim 8, wherein the one or more algorithms include at least one of vision recognition, machine learning, and deep learning.

10. The method of claim 8, wherein the one or more algorithms include at least one of edge detection, corner detection, and texture analysis for identification of stalks.

11. The method of claim 8, further comprising measuring gaps between stalks for identification of stalks.

12. The method of claim 8, further comprising associating each stalk with a GPS position for locating each detected stalk.

13. The method of claim 8, further comprising performing image correction for correction of anomalies introduced by a camera.

14. A system for providing harvest data comprising:
   (a) a row unit;
   (b) an image sensor on the row unit; and
   (c) a processor in communication with the image sensor,
   wherein the image sensor acquires images during harvest and wherein the processor is constructed and arranged to process the acquired images to detect stalks, and wherein the processor is constructed and arranged to determine when a stalk is present in more than one of the acquired images.

15. The system of claim 14, wherein the processor is further constructed and arranged to determine stalk size.

16. The system of claim 15, wherein the processor is further constructed and arranged to determine spaces between stalks for identification of stalks.

17. The system of claim 16, wherein the processor is further constructed and arranged to correct image distortion for identification of stalks.

18. The system of claim 17, wherein the stalk size is determined by detecting boundary lines for identification of stalks.

19. The system of claim 18, wherein the system is constructed and arranged to determine the distance between the image sensor and a stalk for determination of stalk size.

* * * * *